(12) United States Patent
Sagie

(10) Patent No.: US 12,095,946 B2
(45) Date of Patent: Sep. 17, 2024

(54) CONTROL OF COMMUNICATION SERVICES MANAGEMENT

(71) Applicant: G.S. CONSULTING & RESEARCH CORRENET LTD, Nes Ziona (IL)

(72) Inventor: Gonen Sagie, Karmei Yosef (IL)

(73) Assignee: G.S. CONSULTING & RESEARCH CORRENET LTD, Nes Ziona (IL)

( * ) Notice: Subject to any disclaimer, the term of this patent is extended or adjusted under 35 U.S.C. 154(b) by 249 days.

(21) Appl. No.: 17/704,186

(22) Filed: Mar. 25, 2022

(65) Prior Publication Data

US 2022/0311862 A1 Sep. 29, 2022

Related U.S. Application Data

(60) Provisional application No. 63/165,785, filed on Mar. 25, 2021.

(51) Int. Cl.
*H04M 3/00* (2024.01)
*H04L 12/66* (2006.01)
(Continued)

(52) U.S. Cl.
CPC .... *H04M 3/42314* (2013.01); *H04L 65/1053* (2013.01); *H04M 7/006* (2013.01)

(58) Field of Classification Search
CPC ............... H04L 65/1069; H04L 67/306; H04L 41/0894; H04L 41/0893; H04L 65/1046; H04L 67/14; H04L 67/52; H04L 65/1066; H04L 63/102; H04L 63/08; H04L 67/10; H04L 63/0876; H04L 12/2898; H04L 67/12; H04L 63/0236; H04L 65/1094; H04L 65/1096; H04L 43/0817; H04L 67/567; H04L 45/308; H04L 65/1053;
(Continued)

(56) References Cited

U.S. PATENT DOCUMENTS

| 6,393,017 B1* | 5/2002 | Galvin ............ H04M 3/00 370/409 |
| 2008/0043976 A1* | 2/2008 | Maximo ............ H04L 45/00 379/220.01 |

(Continued)

*Primary Examiner* — Kharye Pope
(74) *Attorney, Agent, or Firm* — Tutunjian & Bitetto, P.C.

(57) ABSTRACT

A computer-implemented method, system and computer program product, implementing management of a telephony system comprising one or more PBX systems (PBX) having data repositories having entity information, a temporary data repository comprising entity information from entities in the PBX, and a management repository comprising site information. The method includes obtaining a rule matching entities explicitly defined in the PBX to sites not explicitly defined in the PBX, obtaining entity identifier; obtaining entity information using the entity identifier, comprising querying the temporary repository, applying the rule against the entity, to match a site with which the entity is associated, obtaining site information, and performing an action with respect to the entity based on the site information. Updates to device information to be persistently available is implemented in the data repository of the PBX, and content of the temporary data repository is periodically replaced with data obtained from the data repositories.

22 Claims, 5 Drawing Sheets

(51) Int. Cl.
*H04L 65/1053* (2022.01)
*H04M 3/42* (2006.01)
*H04M 5/00* (2006.01)
*H04M 7/00* (2006.01)

(58) Field of Classification Search
CPC .......... H04L 65/1073; H04M 3/42314; H04M
3/42068; H04M 3/42263; H04M 3/42348;
H04M 2203/2005; H04M 2203/2011;
H04M 2242/30; H04M 1/2757; H04M
1/72457; H04M 3/4234; H04M 3/546;
H04M 7/128; H04M 3/54; H04M 3/543;
H04M 7/006; H04M 3/42229; H04M
2242/03; H04M 3/42
See application file for complete search history.

(56) References Cited

U.S. PATENT DOCUMENTS

| | | | |
|---|---|---|---|
| 2009/0310602 A1* | 12/2009 | Olshansky | H04L 12/66 |
| | | | 370/352 |
| 2010/0048222 A1* | 2/2010 | Gracieux | H04W 4/02 |
| | | | 455/456.1 |
| 2012/0021750 A1* | 1/2012 | Vendrow | H04W 4/029 |
| | | | 455/445 |
| 2018/0077260 A1* | 3/2018 | Faltyn | H04M 3/42323 |

* cited by examiner

CONTROL OF COMMUNICATION SERVICES MANAGEMENT

TECHNICAL FIELD

The present disclosure relates to communication networks in general, and to a method and apparatus for configuring communication network users and devices, in particular.

BACKGROUND

A communication system, including a telephony system is one of the most significant backbones of many organizations, such as commercial companies, government offices, educational institutions, or others. In the last decades, a significant part of the communication volume is carried out using Voice over Internet Protocol (VoIP). The term VoIP generally refers to methods and technologies for the delivery of voice communications and multimedia sessions over Internet Protocol (IP) networks, such as the Internet. VoIP refers to the provisioning of communications services, such as but not limited to voice, voice-messaging, texts, or others over the public Internet.

Many institutes, such as commercial companies, educational institutes, banks, governments, NGOs or others use communication networks comprising one or more public switched telephone networks (PSTNs), also known as plain old telephone service (POTS), as well as VoIP networks. Each such network may provide services to thousands or even hundreds of thousands of users, each using one or more devices, and additional devices not necessarily associated with a particular user.

The users and devices may be dispersed over a plurality of geographical locations, but also over a plurality of logical sub-organizations. For example, a research group of a company may be associated with other research groups located in different areas or countries, rather than with a production group located geographically in the same area or country. The association of a user or group, rather than its geographical location may indicate the user's privileges, options such as voice mail, billing scheme, characteristics such as ringtone, or the like.

Managing this plethora of users and devices is a non-trivial task, which may take significant human labor time and computing resources

BRIEF SUMMARY

One exemplary embodiment of the disclosed subject matter is a computer-implemented method for implementing telephony management of a telephony system that comprises: one or more Private Branch Exchange (PBX) systems, each having a separate data repository comprising entity information; a temporary data repository comprising entity information from entities defined in each of the PBX systems; and a management repository comprising site information, the method comprising: obtaining one or more matching rules for matching entities to sites, wherein the entities are explicitly defined in the separate PBX systems, wherein the sites are not explicitly defined in the PBX systems; obtaining entity identifier of an entity, wherein the entity is defined within a PBX system of the PBX systems; obtaining entity information using the entity identifier, wherein said obtaining entity information comprises querying the temporary repository for entity information associated with the entity identifier; applying the matching rules against the entity according to the entity information, to match one or more sites with which the entity is associated; obtaining site information from the management repository regarding the one or more sites; performing an action, wherein the action is performed with respect to the entity and based on the site information; wherein any update to device information to be persistently available in the telephony system is implemented in the separate data repository of one or more of the PBX systems; and wherein content of the temporary data repository is periodically replaced with aggregated data obtained from the separate data repositories of the PBX systems. The method can further comprise obtaining the entity information from one or more of the separate data repositories of one of the PBX systems, upon failure to obtain the entity information from the temporary data repository. Within the method, the entity is optionally a communication device. Within the method, the entity is optionally a user. Within the method, the PBX systems optionally comprise an IP PBX system. Within the method, the site optionally relates to a geographical location. Within the method, the site optionally relates to an organizational unit. Within the method, one of the matching rules optionally requires a first matching between a first location received from the communication manager and a second location of the site. Within the method, upon mismatch of the location received from the communication manager and the geographic location of the site, the matching rule optionally requires a second matching between a first device pool identifier received from the communication manager and a second device pool of the site. Within the method, the site information is optionally not available in the at least one PBX system. Within the method, the action optionally comprises assigning to the entity characteristics associated with the site. Within the method, the action optionally comprises one or more items selected from the group consisting of: setting a billing plan for the entity; setting a ringtone for a communication device; setting a speed dial for the communication device; setting voicemail; setting extension mobility; single number reach; instant messaging; call forwarding; device settings; lines settings; internal network directory numbers; direct inward dialing (DID) patterns; mapping of DID to DN; translation pattern; call park; call pickup groups; meet-me numbers; and hunt group. Within the method, the entity optionally comprises one or more items selected from the group consisting of: a physical desk phone, a video endpoint, a softphone, a Computer Telephony Integration (CTI) route point, a port; and an analog gateway port. Within the method, the telephony system may further comprise an auxiliary local storage storing information required for performing a specific task related to one or more sites. Within the method, the specific task optionally comprises issuing a report related to billing for the site, or activities performed by entities associated with the site.

Another exemplary embodiment of the disclosed subject matter is a computerized apparatus having a processor, the processor being configured to perform in a telephony system that comprises: one or more Private Branch Exchange (PBX) systems, each having a separate data repository comprising entity information; a temporary data repository comprising entity information from entities defined in each of the PBX systems; and a management repository comprising site information, a method comprising obtaining one or more matching rules for matching entities to sites, wherein the entities are explicitly defined in the PBX systems, wherein the sites are not explicitly defined in the PBX systems; obtaining entity identifier of an entity, wherein the entity is defined within a PBX system of the PBX systems; obtaining entity information using the entity identifier, wherein said obtaining entity information comprises querying the temporary repository for entity information associated with the entity identifier; applying the matching rules against the entity according to the entity information, to match one or more sites with which the entity is associated; obtaining site information from the management repository regarding the one or more sites; performing an action, wherein the action is performed with respect to the entity and based on the site information; wherein any update to device information to be persistently available in the telephony system is implemented in the separate data repository of one or more of the PBX systems; and wherein content of the temporary data repository is periodically replaced with aggregated data obtained from the separate data repositories of the PBX systems. Within the apparatus, the method optionally further comprises obtaining the entity information from one or more of the separate data repositories of one of the PBX systems, upon failure to obtain the entity information from the temporary data repository. Within the apparatus, one of the matching rules optionally requires a first matching between a first location received from the communication manager and a second location of the site, and wherein upon mismatch of the location received from the communication manager and the geographic location of the site, the matching rule requires a second matching between a first device pool identifier received from the communication manager and a second device pool of the site. Within the apparatus, the telephony system further comprises an auxiliary local storage storing information required for performing a specific task related to at least one site. Within the apparatus, the specific task optionally comprises issuing a report related to billing for the site, or activities performed by entities associated with the site. Within the apparatus, the PBX systems optionally comprise an IP PBX system.

Another exemplary embodiment of the disclosed subject matter is a computer program product comprising a computer readable storage medium retaining program instructions, which program instructions when read by a processor, cause the processor to perform in a telephony system that comprises: one or more Private Branch Exchange (PBX) systems, each having a separate data repository comprising entity information; a temporary data repository comprising entity information from entities defined in each of the PBX systems; and a management repository comprising site information, a method comprising: obtaining one or more matching rules for matching entities to sites, wherein the entities are explicitly defined in the PBX systems, wherein the sites are not explicitly defined in the PBX systems; obtaining entity identifier of an entity, wherein the entity is defined within a PBX system of the PBX systems; obtaining entity information using the entity identifier, wherein said obtaining entity information comprises querying the temporary repository for entity information associated with the entity identifier; applying the matching rules against the entity according to the entity information, to match one or more sites with which the entity is associated; obtaining site information from the management repository regarding the one or more sites; performing an action, wherein the action is performed with respect to the entity and based on the site information; wherein any update to device information to be persistently available in the telephony system is implemented in the separate data repository of one or more of the PBX systems; and wherein content of the temporary data repository is periodically replaced with aggregated data obtained from the separate data repositories of the PBX systems.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
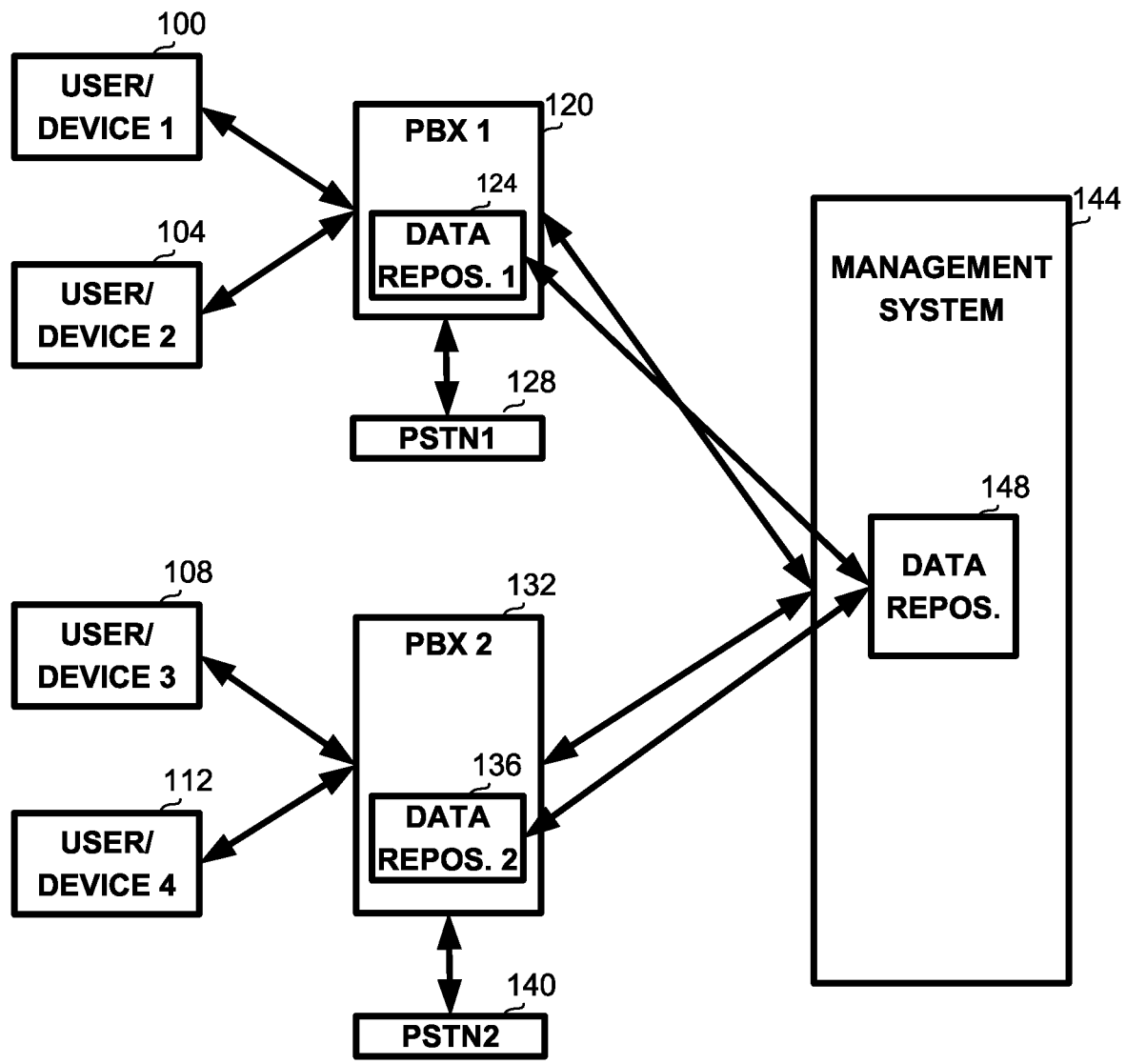
FIG. 1 is a schematic configuration of the communication network in an organization.

One technical problem handled by the disclosure relates to configuring users and devices of a network, wherein each device may or may not be associated with a user and each user may be associated with one or more devices. Devices may include but are not limited to any one or more of the following: physical desk phones, video endpoints, softphones, Computer Telephony Integration (CTI) route points, ports and endpoints, analog gateway ports, or the like.

A communication system of an organization such as a commercial company, an educational institute, a financial institute, or the like, may comprise a plurality of Private Branch eXchange (PBX) systems, optionally dispersed over one or more geographical areas, possibly in multiple countries. By their nature, many PBX systems do not allow for convenient, large-scale, management of users, endpoints and dial plan elements. The organization may also comprise a plurality of sub-organizations, referred to as sites, which are not necessarily aligned with the geographical locations. A site may comprise users, endpoints and dial plan elements. For example, the site may be a separately billed entity of an organization, an organizational unit that is addressed separately for logistical purposes, or the like. A site may be defined explicitly, by enumerating its elements, or defined using mapping rules.

In an example, a company may comprise one or more production centers in one or more countries, and one or more research centers, in the same or different countries. For example, a research center and a production center may connect to the same PBX. Although the production centers may be closely related and considered one site, and the research centers may be considered a different site.

Association with a site may indicate a plurality of common features and characteristics for its entities, such as setting a billing plan for the entity; setting a ringtone for a communication device; setting a speed dial for the communication device; setting voicemail; setting extension mobility; single number reach; instant messaging; call forwarding; device settings; lines settings; internal network directory numbers; direct inward dialing (DID) patterns; mapping of DID to DN; translation pattern; call park; call pickup groups; meet-me numbers; and hunt group. or the like.

In current techniques, when performing management tasks for an entity, a plurality of remote PBX systems may have to be accessed in order to determine and assign the right characteristics for the entity, which may consume valuable communication, processing and labor resources.

Additionally, while it is important to determine the site a device or user is associated with in order to assign the relevant features and characteristics, the geographic location of a user, and the PBX a device is connected to are not necessarily indicative of its site. Therefore, there is a need to automatically determine the site, such that the device can be efficiently configured.

Another technical problem of the disclosure relates to providing additional services to a site, such as billing, reports, or the like, in an efficient manner, without having to address a plurality of remote devices.

Referring now to FIG. 1, showing a schematic configuration of a communication network in an organization.

The organization may comprise a plurality of users or devices, such as user/device 1 (100), user/device 2 (104), user/device 3 (108), user/device 4 (112), each such device being a deskphone, a smartphone, a softphone, a video endpoint, a Computer Telephony Integration (CTI) route points, a port and an Analog gateway port, or the like, and wherein each user may be associated with at least one device.

In an example, User/Device 1 (100) and User/Device 2 (104) are physically connected to PBX 1 (120), and User/Device 3 (108) and User/Device 4 (112) are physically connected to PBX 2 (132).

PBX 1 (120) comprises a Data Repository 1 (124) which contains data about User/Device 1 (100) and User/Device 2 (104), such as their location, line number, extension, or the like. PBX 1 (120) is physically connected to a Public Switched Telephone Network (PSTN) 1 (128), which provides the communication capabilities to user/device 1 (100) and User/Device 2 (104).

Similarly, PBX 2 (132) comprises a Data Repository 2 (136) which contains data about User/Device 3 (108) and User/Device 4 (112). PBX 2 (132) is physically connected a PSTN 2 (140), which provides the communication capabilities to User/Device 3 (108) and User/Device 4 (112).

PBX 1 (120) and PBX 2 (132) are connected to a Management System 144, which may be remote from any or both of the PBXs, and comprises Data Repository 148 which comprises data duplicated from Data Repository 1 (124) and Data Repository 2 (136). Thus, when managing users or devices whether in Management System 144 or in any of the data repositories of the PBXs, both Management System 144 and the relevant PBX need to be accessed and updated.

In some situations, User/Device 1 (100) and User/Device 4 (112), although connected to different PBXs, belong to one logical site, for example a research group, while User/Device 2 (104) and User/Device 3 (108), although also connected to different PBXs, belong to another logical site, for example a production group. Therefore, similar characteristics, capabilities and policies may apply to User/Device 1 (100) and User/Device 4 (112), while others may apply to User/Device 2 (104) and User/Device 3 (108).

Configuring the users according to their sites may thus consume significant work and communication resources.

One technical solution comprises a management system that complements the PBX systems of an organization, and allows seamless management of the PBX systems, wherein any of the PBX systems may be on-site, remote, cloud-based, or the like.

The management system, also referred to as Direct Customer Provisioning (DCP) system, enables a user such as a system administrator, an IT person, or installer to login into a single environment, and configure and manage all resources therefrom, using a user interface that may be detached from that of any of the PBXs.

The management system may be useful in mapping entities to sites, wherein the site association is generally unknown to the PBXs, which operate at a lower abstraction level.

The system may be used, for example, when a new device is connected to one of the PBXs, and it is required to configure the device according to the site it is to be associated with. The DCP may automatically determine the site the new device is to be associated with, and configure the device accordingly. The DCP may store a management repository, comprising for example rules indicating how users or devices are to be associated with sites. The rules may be defined by a user, imported, generated automatically, learned over time, or generated in any other manner. For example, the rules may associate line numbers or other data with a particular site. The rules may use regular expressions, patterns, or other grouping mechanisms for mapping endpoints or dial plan elements of a user or a device, to a site.

The DCP may store a temporary data repository comprising entity information of entities defined in each of the PBX systems of the organization. The entity information may be a subset of the information stored for the entity within the PBX, for example only the information required for determining the site of an entity. The temporary data repository may be periodically updated from the PBX systems which store the "ground truth" as related to the various devices. Thus, when searching for details of a new entity to be associated with a site, the DCP may first search the temporary data repository, which may be a very fast and efficient search and does not require addressing the PBXs. Only if the data is not found in the temporary data repository, the DCP may address the PBX to obtain the details.

However, the temporary data repository is indeed temporary, and the data therein may be replaced without further notice by data updated from the PBX systems. Thus, any changes made by the DCP may also be introduced to the PBX, in order to make the changes persistent.

Figure 2:
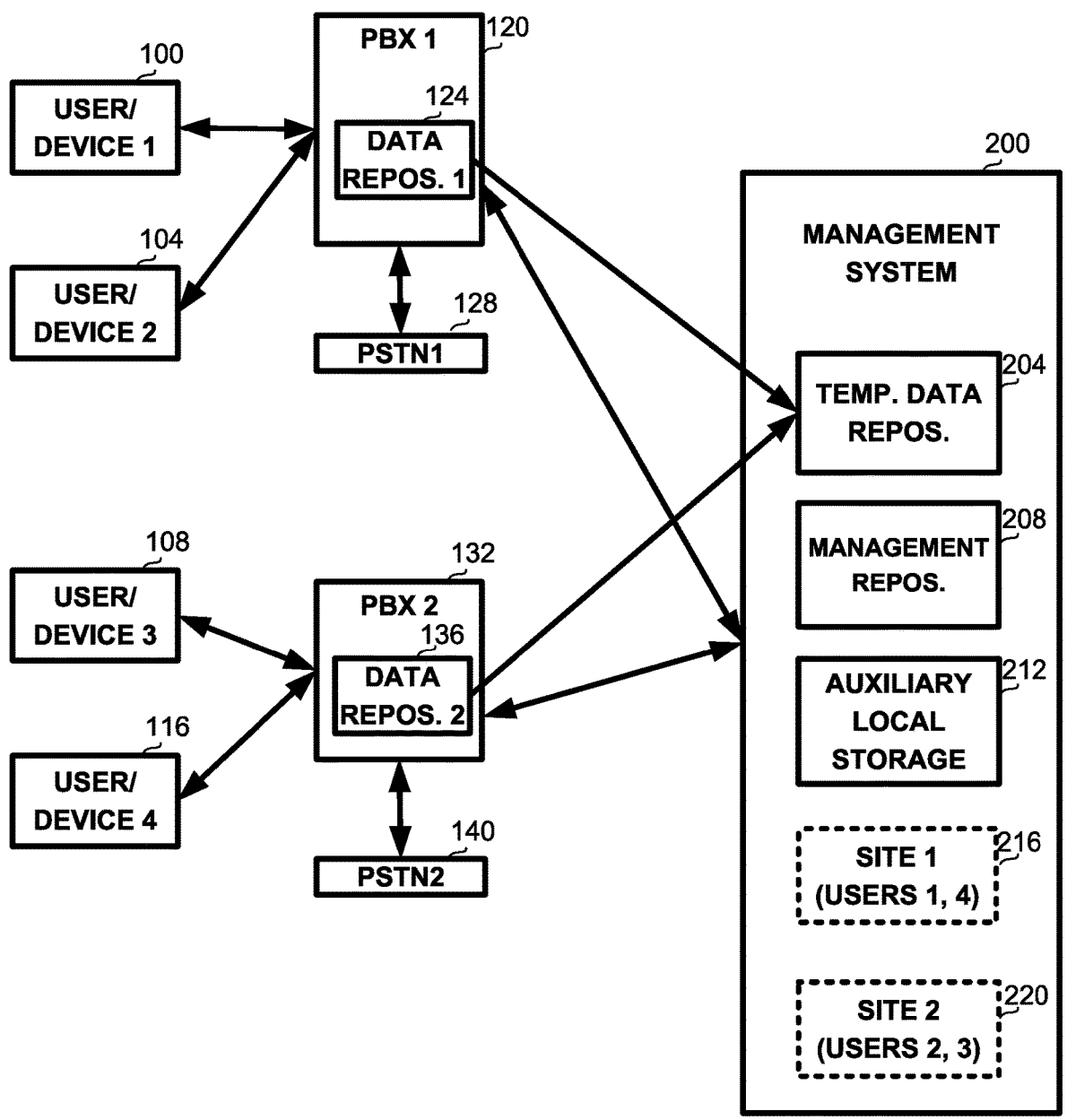
FIG. 2 is a schematic configuration of the communication network in an organization, in accordance with some exemplary embodiments of the disclosure.

Referring now to FIG. 2, showing a schematic configuration of a communication network in the organization, in accordance with some exemplary embodiments of the disclosure.

The users, devices, PBXs and PSTNs may be as described in association with FIG. 1 above.

Management System 200, such as a DCP may comprise a Temporary Data Repository 204, which stores data obtained from Data Repository 1 (124) and from Data Repository 2 (136), the data related to a plurality of users and/or devices.

Management System 200 may comprise a Management Repository 208, comprising rules for associating users or devices with sites. The rules may be expressed as text, as binary objects, as executable units for determining a site to be associated with a particular user or determining whether a particular user is to be associated with a particular site, or in any other manner.

Management System 200 may comprise Auxiliary Local Storage 212 for storing auxiliary data related to site management, for example data for generating reports, billing, or other requirements which may relate to a site.

It will be appreciated that any of the storage or repositories above may be implemented on one or more storage devices, whether co-located on operatively connected.

Management System 200 may comprise a representation, such as a data structure stored on a storage device, of various sites associated with the organization. Thus, Management System 200 may comprise a representation of Site 1 (216), with which User/Device 1 (100) and User/Device 4 (112) are associated, and a representation of Site 2 (220), with which User/Device 2 (104) and User/Device 3 (108) are associated. The representation may comprise a list of users associated with the site and characteristics or properties thereof, actions performed with the site definition or any of the user's definition, characteristics of the site such as line number range, geographical locations, or the like.

When configuring one or more devices, Management System 200 may attempt to retrieve the device details from Temporary Data Repository 204, also referred to as a cache. If the data is available within the cache, the data may be checked against the site association rules. If any of the rules applies, the user or device may be associated with the site corresponding to the rule. If the data is not available, a deep search may be performed, in which one or more PBXs are queried, for example through their dedicated Abstract Program Interface (API) for retrieving the data.

The data in Temporary Data Repository 204 may be updated by Management System 200, however, the changes are not guaranteed to be maintained. Rather, data from the data repositories of the PBXs may be imported in an ongoing manner, or at predetermined time intervals, for example every hour, every day, every week or the like, and erase any changes performed to the data in Temporary Data Repository 204. Moreover, changes to the structure of Temporary Data Repository 204 are also not guaranteed to be persistent.

Figure 3:
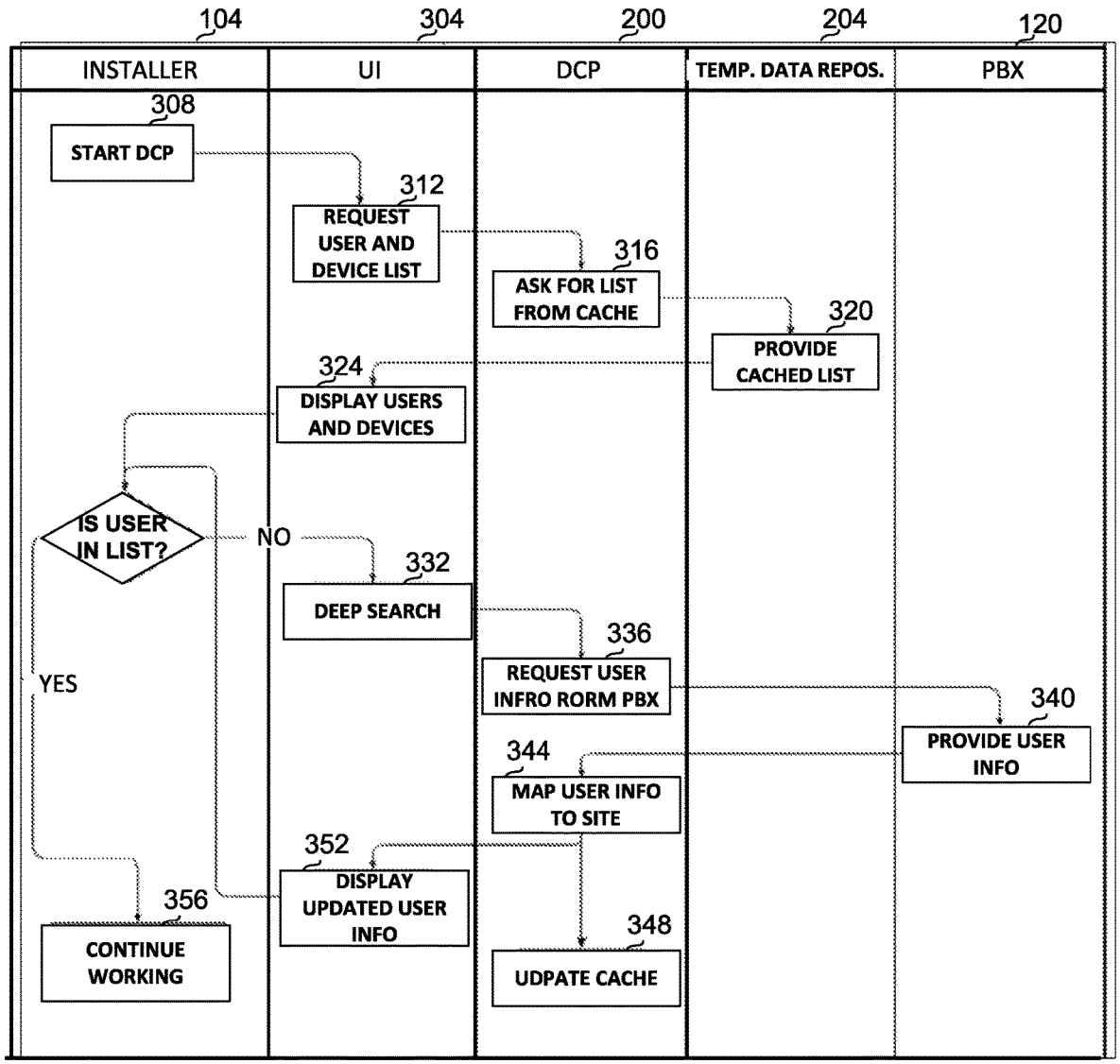
FIG. 3 is a flowchart of steps control flow between entities within a communication system, in accordance with some exemplary embodiments of the disclosure.

Referring now to FIG. 3, demonstrating the action and control flow within various entities in a system in accordance with the disclosure. The entities may include Installer 104 such as an IT personnel or the like, operating User Interface (UI) 304 for activating Management System 200, also referred as DCP. Management System 200 may access Temporary Data Repository 204. Management System 200 may also access a data repository of PBX 120, through an API of PBX 120.

On step 308, Installer 104 wishing to perform operations related to a particular device or user may start operating Management System 200, by using UI 304.

On step 312, UI 304 may request a user and device list from Management System 200.

On step 316, Management System 200 may attempt to retrieve the same from Temporary Data Repository 204.

On step 320, Temporary Data Repository 204 may provide to Management System 200 the available list of users and devices, to be displayed using UI 304 on step 324.

If the user or device upon which the operation is to be performed is found in the displayed list, on step 356 the installer may keep working and configure or otherwise manipulate the user or device.

However, if the user is not found, then on step 332, UI 304 may activate Management System 200 to initiate deep search.

On step 336, Management System 200 may request the information for the particular user from PBX 120.

On step 340, the PBX may provide, through its API, the user info to Management System 200

On step 344, Management System 200 may map the user to a site, based on the received user info and by applying one or more rules from Management Repository 208.

On step 348, Management System 200 may update Temporary Data Repository 204 with the user information, as received from PBX 120, and as updated by Management System 200.

On step 352, Management System 200 may display the updated information over UI 304. On the next check in step 328, the user information will be found, and the installer can keep working, configuring the user, or the like.

One technical effect of the disclosure thus provides for a management system for configuring a plurality of users connected to a plurality of PBXs, regardless of which PBX system each user is physically connected to. The management system thus provides for a single access point for organization wise management, without having to connect to the plurality of PBXs and without duplicating all the information of the PBXs to the management system.

Another technical effect of the disclosure comprises the automatic association of a user with a site, wherein in a typical case there is no need to retrieve information from any of the PBXs, but rather utilize a temporary local storage, thereby providing an efficient service.

Yet another technical effect of the disclosure relates to the management system supporting additional activities such as reporting, as related to various users, devices or sites, without having to access remote storage devices such as PBXs storages. Such activities may include generating reports, billing, or the like.

Figure 4:
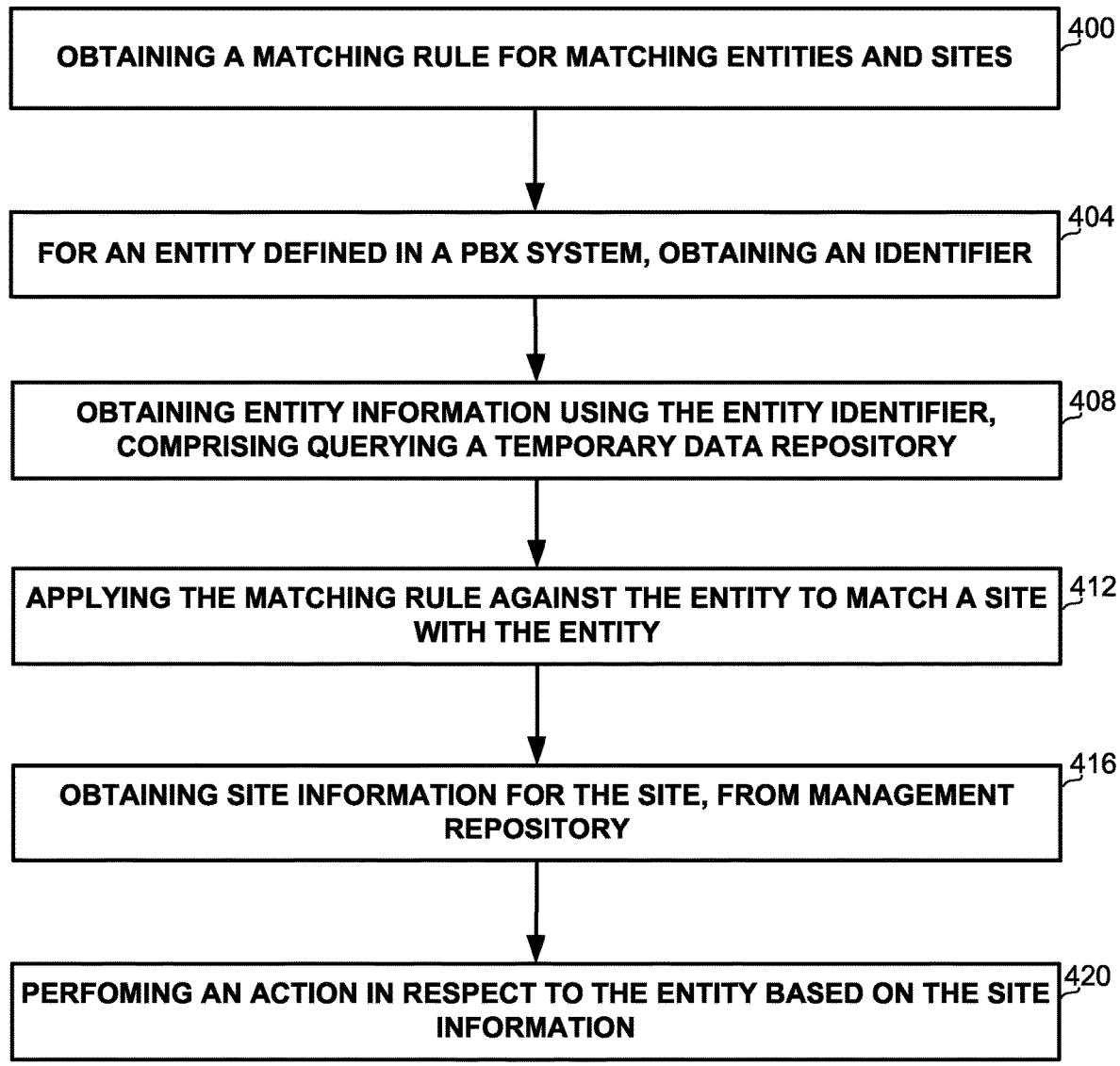
FIG. 4 is a flowchart of steps in a method for managing a communication system in an organization, in accordance with some exemplary embodiments of the disclosure.

Referring now to FIG. 4, showing a flowchart of steps in a method for managing a communication system in an organization, in accordance with some exemplary embodiments of the disclosure.

The method may be applied in a communication system that, such as a telephone system, that comprises a one or more separate PBXs, for example one, two or more PBXs, each having a data repository comprising entity information, wherein the entity may be a communication device, or a representation of a user using at least one device. Each of the PBX systems may be a telephony system, an IP PBX system, or the like.

However, the PBX systems do not comprise site definition of the sites of the organization, and particularly not explicit site information. The telephony system may comprise a management system, comprising or having access to a temporary data repository storing entity information for entities defined in the PBX systems. The data may not be a full replica of the data stored in the PBXs, but rather only the data required for site-related activities.

The data within the temporary data repository may be subject to deletion, overwriting or any other change. For example, it may be periodically overwritten by data from the data repository of the separate PBX systems.

The management system may also comprise or have access to a management repository comprising site information. A site may relate to a logical unit of the organization. For example, a site may refer to entities within a certain geographic location, within an organizational unit, a combination of two or more geographical locations or organizational units, or the like. It will also be appreciated that one geographic location may comprise entities associated with two or more sites.

The site information may comprise, for example, a list of users or devices associated with each site, information about the geographic location(s) of the site, features to be applied to devices associated with the site, or the like. The site information or another repository may also comprise rules to be applied to users or devices in order to determine a site they are to be associated with.

The method may be performed by the management system.

On step 400, the method may comprise obtaining one or more matching rules for matching entities to sites, wherein the entities are explicitly defined in the PBX systems, but as detailed above, the sites are not explicitly defined in PBX systems.

The rules may be obtained from an installer or other personnel, imported from an external source, read from a file, implicitly deduced from data, learned over time, or the like.

On step 404, an entity identifier may be obtained for an entity defined within any of the PBX systems. The identifier may be a random number, an extension number, a combination of a line number and an extension number, a name, or the like. The entity may relate, for example, to a device newly connected to a PBX in the organization network, wherein the entity needs to be configured according to a site it is to be associated with.

On step 408, information related to the entity may be obtained. The information may be obtained by querying the temporary repository for entity information associated with the entity identifier.

However, information about the entity may not be available on the temporary repository. Such a situation may occur, for example, if the entity has been created and associated with a PBX system after the last time the temporary repository has been updated with data from the PBX system.

In this case, the entity information may be obtained from a data repository of one of the separate PBX systems.

On step 412, the matching rule as obtained in step 400, may be applied against the entity information obtained on step 408, to obtain at least one site with which the entity is associated.

For example, the rule may first refer to a geographic location. If a rule indicates the geographic location of an entity as a site indicator, then an entity residing at that location is associated with the site. If no applicable rule is associated with the entity location, then rules indicating device pools may be applied to the entity, such that if the entity matches the device pool, it is associated with the site.

In another example, the rule may indicate a range of line numbers that are associated with a particular site. If the line number of the new entity is within the range, the device may be associated with the site.

If no association is found, or an installer determines that the entity is to be associated with a site other than the one provided by a rule, the installer may indicate a different site for the entity. The installer may update the information for the particular site such as site 1 (216) or site 2 (220), and/or any other data structure. The installer may further update the rules in Management Repository 208. For example, the installer may update the range of line numbers to be associated with a site.

On step 416, once the at least one site is determined, site information related to the at least one site may be obtained from the management repository. The site information may include, for example, characteristics or settings to be applied to devices associated with the site.

On step 420, an action may be performed in respect to the entity, based on the site information.

The action may be, for example, assigning characteristics associated with the site to the entity. For example, the action may be but is not limited to any one or more of the following: setting a billing plan for the entity; setting a ringtone for a communication device; setting a speed dial for the communication device; setting voicemail; setting extension mobility; single number reach; instant messaging; call forwarding; device settings; lines settings; internal network directory numbers; direct inward dialing (DID) patterns; mapping of DID to directory number (DN); translation pattern; auto attendant; call park; call pickup groups; forced authorization codes; meet-me numbers; and hunt group.

The action may cause updating the entity characteristics in Temporary Data Repository 204 of Management System 200 and/or in Auxiliary Local Storage 212. However, in addition, the data repository of the PBX which the entity is connected to, such as Data Repository 1 (124) or Data Repository 2 (136), also needs to be updated since the data in Temporary Data Repository 204 may be subject to deletion, overwriting or changing, for example due to periodic replacement by data from the repositories of the PBX. Thus, any update to the device information which needs to be persistently available in the telephony system may be implemented in the data repository of at least one of the PBX systems, such as Data Repository 1 (124) and Data Repository 2 (136) which are considered to store the "ground truth".

In some embodiments, Management System 200 may utilize Auxiliary Local Storage 212 for providing additional services to the organization, such as site-related services. For example, Auxiliary Local Storage 212 may be used for generating reports on entities associated with a site such as usage reports, billing reports, or the like.

In some embodiments, and in particular when the system starts working and the rules are not perfectly defined yet, when no applicable rules are found and the installer needs to manually set a site, when the installer overwrites the site determined by the system, or in other situations, the rule definitions may be learned and/or updated. Learning may relate to supervised learning in which the label is the site indicated by the installer. In other embodiments, unsupervised learning may be performed, for example by clustering line numbers, the number range for sites may be learned. In another example, if multiple entities from a certain geographic area are assigned to a particular site, this may be useful in defining a rule.

Figure 5:
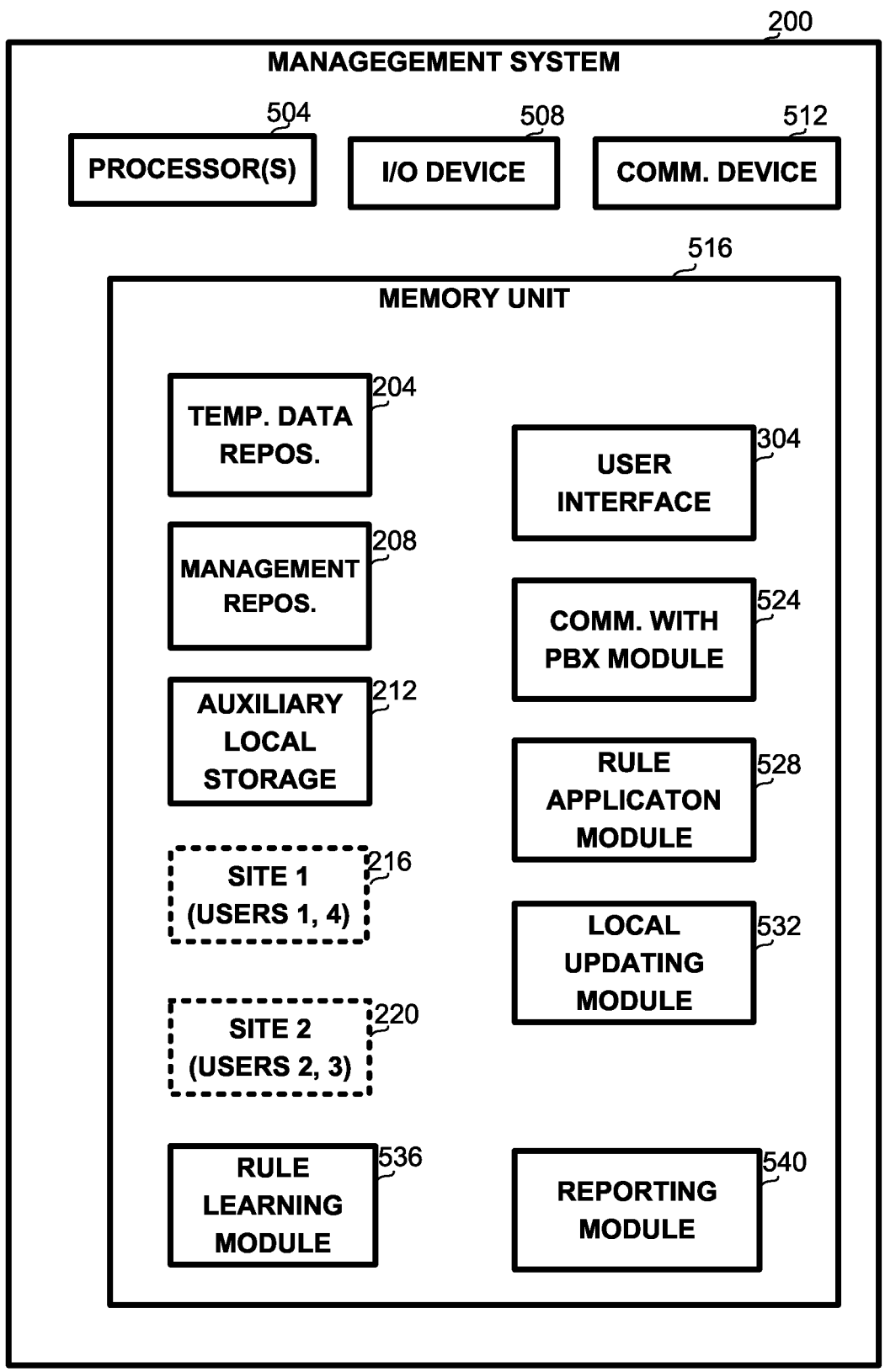
FIG. 5 is a block diagram of an apparatus for managing a communication system in an organization, in accordance with some exemplary embodiments of the disclosure.

Referring now to FIG. 5, showing a schematic illustration of a system for managing a communication system in an organization, in accordance with some exemplary embodiments of the disclosure.

In some exemplary embodiments, the system may be implemented using a computing platform such as a cloud computer, a server, a desktop computer, a mobile computer, or the like which implements management system 200. Management System 200 may comprise one or more Processor(s) 504, such as a Central Processing Unit (CPU), a microprocessor, an electronic circuit, an Integrated Circuit (IC) or the like. Processor 504 may be utilized to perform computations required by Management System 200 or any of its subcomponents. Processor 504 may be configured to execute computer-programs useful in performing the method of FIG. 4 above.

In some exemplary embodiments, Management System 200 may comprise one or more I/O devices 508 which may be configured to receive input from and provide output to a user. In some exemplary embodiments, I/O Devices 508 may be utilized to present to the user, such as an installer, a user interface, display entity information, obtain user definitions for the rules, apply the rules and display the results. I/O Devices 508 may comprise a display, keyboard, a mouse, a touch screen or another pointing or tracking device, a voice activated device, or the like.

In some exemplary embodiments Management System 200 may comprise a Communication Device 512, for communicating with other systems, such as but not limited to PBXs, other systems in the organization, storage devices, or the like.

In some exemplary embodiments Management System 200 may comprise a Memory Unit 516. Memory Unit 516 may be a short-term storage device or long-term storage device. Memory Unit 516 may be a persistent storage or volatile storage. Memory Unit 516 may be a disk drive, a Flash disk, a Random Access Memory (RAM), a memory chip, or the like. Memory Unit 516 may be a single memory device, or multiple interconnected memory devices which may be co-located or located in different locations and communicating via any communication channel.

As detailed in association with FIG. 2, Memory Unit 516 may retain Temporary Data Repository 204, Management Repository 208, Auxiliary Local Storage 212 and representations of various sites, such as Site 1 (216), Site 2 (220), or the like.

In some exemplary embodiments, Memory Unit 516 may retain program code operative to cause Processor 504 to perform acts associated with any of the subcomponents of Management System 200 and steps of FIG. 4. The components detailed below may be implemented as one or more sets of interrelated computer instructions, executed by processor 504.

Memory Unit 516 may retain User Interface 304, for displaying information to a user over I/O Device 508, and receiving instructions from the user.

Memory Unit 516 may retain Communication with PBX Module 524, for requesting and receiving data from one ore more PBX systems, updating PBX systems with new data, or the like. Communication with PBX system may be performed using the API of the PBX systems over any applicable communication channel.

Memory Unit 516 may retain Rule Application Module 528 for applying one or more rules to an entity, based on the entity information, in order to obtain a site to be associated with the entity.

Memory Unit 516 may retain Local Updating Module 532, for locally updating any one or more of Temporary Data Repository 204, Management Repository 208, Auxiliary Local Storage 212, Site 1 (216), Site 2 (220), or other repositories, with data such as a site associated with an entity, characteristics assigned to entities, rule definitions, site information, or the like.

Memory Unit 516 may retain Rule Learning Module 536 for analyzing the sites associated with entities, and learning or improving the rules for associating entities with sites.

Memory Unit 516 may retain Reporting Module 540, for generating reports which may be related to sites. The reports may be based on locally available information, which does not require querying the PBX systems. The reports may relate to the sites, which are generally unknown to the PBX systems. For example, reports may relate to billing, activities performed by the site members or the like.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, Java, JavaScript, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method for managing a plurality of Private Branch Exchange (PBX) systems of a telephony system, the telephony system comprises:
    at least two PBX systems, each of the at least two PBX systems having a separate data repository comprising separate entity information, the at least two PBX systems comprise first and second PBX systems, the first PBX system comprising a first separate data repository and the second PBX system comprising a second separate data repository, the first and second separate data repositories do not comprise site information;
    a temporary data repository comprising duplicated data, the duplicated data comprises duplicated entity information from the first and second separate data repositories, wherein the duplicated data comprises temporary content that is periodically updated with new content from the first and second separate data repositories; and
    a management repository comprising the site information, the site information comprising site association rules for matching entities to sites, the site association rules comprising a site association rule for determining whether a site is associated with a particular entity, wherein if the site association rule is complied with by the particular entity, the particular entity is determined to be associated with the site;
    the method comprising:
        obtaining an identifier of a device for configuration, wherein the device is defined by the first separate data repository of the first PBX system, wherein the device is connected to the first PBX system;
        obtaining information related to the device by querying the temporary data repository, wherein the information is obtained from the temporary data repository and not from any of the plurality of PBXs, said querying utilizes the identifier of the device;
        correlating the information related to the device with the site association rules of the management repository to match the device with at least one site;
        obtaining settings regarding the at least one site from the management repository, the settings are configured to be applied to devices associated with the at least one site; and
        performing an action based on the settings, the action comprising applying the settings to the device, thereby configuring the device according to the at least one site.

2. The method of claim 1, further comprising:
    obtaining a second identifier of a second device defined by the second separate data repository of the second PBX system, wherein the second device is connected to the second PBX system; and
    obtaining second information related to the second device from the second PBX system, upon failure to obtain the second information from the temporary data repository by querying the temporary data repository.

3. The method of claim 2, wherein the first and second devices belong to a same site.

4. The method of claim 1, wherein the temporary data repository comprising a subset of the information from the first and second separate data repositories.

5. The method of claim 1, wherein the site association rule comprises at least one of: a regular expression, a pattern, and a range of line numbers that are associated with the site.

6. The method of claim 1, wherein the at least one site relates to a geographical location, wherein the site association rule is complied with by the device if a user of the device resides at the geographical location.

7. The method of claim 1, wherein the at least one site relates to an organizational unit.

8. The method of claim 1, wherein the site association rule is complied with by the device if a first location received from the temporary data repository matches a second location of the at least one site.

9. The method of claim 1, wherein the first and second PBX systems are physically connected to respective public switched telephone networks.

10. The method of claim 1, wherein the action further comprises updating characteristics of the device in the temporary data repository or in the first separate data repository.

11. The method of claim 1, wherein the action comprises assigning to the device characteristics associated with the at least one site.

12. The method of claim 1, wherein the action is related to at least one item selected from the group consisting of:
setting a billing plan for the device;
setting a ringtone for the device;
setting a speed dial for the device;
setting voicemail;
setting extension mobility;
single number reach;
instant messaging;
call forwarding;
device settings;
lines settings;
internal network directory numbers;
direct inward dialing (DID) patterns;
mapping of DID to DN;
translation pattern;
call park;
call pickup groups;
meet-me numbers; and
hunt group.

13. The method of claim 1, wherein the device is at least one item selected from the group consisting of: a physical desk phone, a video endpoint, a softphone, a smartphone, and a Computer Telephony Integration (CTI) route point.

14. The method of claim 1, wherein the telephony system further comprises an auxiliary local storage storing information required for performing a specific task related to the at least one site.

15. The method of claim 14, wherein the specific task comprises issuing a report related to billing for the at least one site, or issuing a report related to activities performed by entities associated with the at least one site.

16. A computerized apparatus having a processor, the processor being configured to perform a method for managing a plurality of Private Branch Exchange (PBX) systems of a telephony system, the telephony system comprises: at least two PBX systems, each of the at least two PBX systems having a separate data repository comprising separate information, the at least two PBX systems comprise first and second PBX systems, the first PBX system comprising a first separate data repository and the second PBX system comprising a second separate data repository, the first and second separate data repositories do not comprise site information;
a temporary data repository comprising duplicated data, the duplicated data comprises duplicated information from the first and second separate data repositories, wherein the duplicated data comprises temporary content that is periodically updated with new content from the first and second separate data repositories; and
a management repository comprising the site information, the site information comprising site association rules for matching entities to sites, the site association rules comprising a site association rule for determining whether a site is associated with a particular entity, wherein if the site association rule is complied with by the particular entity, the particular entity is determined to be associated with the site;
the method comprising:
obtaining an identifier of a device for configuration, wherein the device is defined by the first separate data repository of the first PBX system, wherein the device is connected to the first PBX system;
obtaining information related to the device by querying the temporary data repository, wherein the information is obtained from the temporary data repository and not from any of the plurality of PBXs, said querying utilizes the identifier of the device;
correlating the information related to the device with the site association rules of the management repository to match the device with at least one site;
obtaining settings regarding the at least one site from the management repository, the settings are configured to be applied to devices associated with the at least one site; and
performing an action based on the settings, the action comprising applying the settings to the device, thereby configuring the device according to the at least one site.

17. The apparatus of claim 16, wherein the method further comprises:
obtaining a second identifier of a second device defined by the second separate data repository of the second PBX system, wherein the second device is connected to the second PBX system; and
obtaining second information related to the second device from the second PBX system, upon failure to obtain the second information from the temporary data repository by querying the temporary data repository, wherein the first and second devices belong to a same site.

18. The apparatus of claim 16, wherein the site association rule comprises at least one of: a regular expression, a pattern, and a range of line numbers that are associated with the site.

19. The apparatus of claim 16, wherein the telephony system further comprises an auxiliary local storage storing information required for performing a specific task related to the at least one site.

20. The apparatus of claim 19, wherein the specific task comprises issuing a report related to billing for the at least one site, or issuing a report related to activities performed by entities associated with the at least one site.

21. The apparatus of claim 16, wherein the site association rule is complied with by the device if a first location received from the temporary data repository matches a second location of the at least one site.

22. A computer program product comprising a computer readable storage medium retaining program instructions, which program instructions when read by a processor, cause the processor to perform a method for managing a plurality of Private Branch Exchange (PBX) systems of a telephony system, the telephony system comprises:
- at least two PBX systems, each of the at least two PBX systems having a separate data repository comprising separate information, the at least two PBX systems comprise first and second PBX systems, the first PBX system comprising a first separate data repository and the second PBX system comprising a second separate data repository, the first and second separate data repositories do not comprise site information;
- a temporary data repository comprising duplicated data, the duplicated data comprises duplicated information from the first and second separate data repositories, wherein the duplicated data comprises temporary content that is periodically updated with new content from the first and second separate data repositories; and
- a management repository comprising the site information, the site information comprising site association rules for matching entities to sites, the site association rules comprising a site association rule for determining whether a site is associated with a particular entity, wherein if the site association rule is complied with by the particular entity, the particular entity is determined to be associated with the site;
- obtaining an identifier of a device for configuration, wherein the device is defined by the first separate data repository of the first PBX system, wherein the device is connected to the first PBX system;
- obtaining information related to the device by querying the temporary data repository, wherein the information is obtained from the temporary data repository and not from any of the plurality of PBXs, said querying utilizes the identifier of the device;
- correlating the information related to the device with the site association rules of the management repository to match the device with at least one site;
- obtaining settings regarding the at least one site from the management repository, the settings are configured to be applied to devices associated with the at least one site; and
- performing an action based on the settings, the action comprising applying the settings to the device, thereby configuring the device according to the at least one site.

* * * * *